Figure 1:
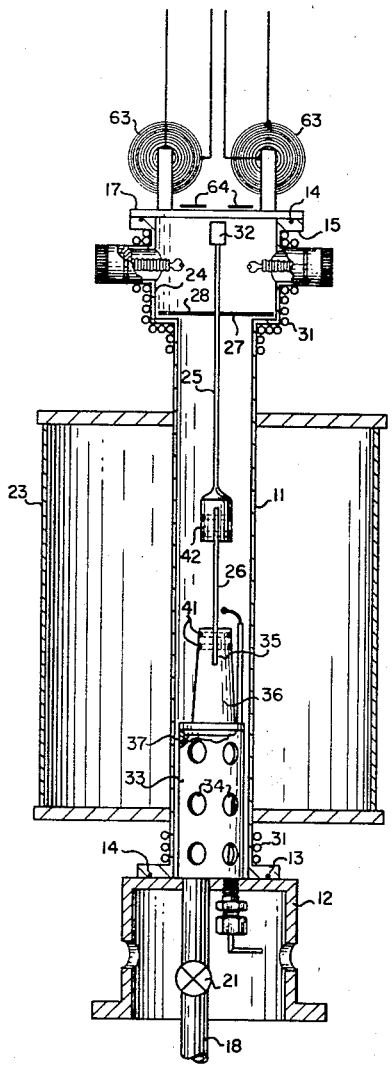

March 26, 1968

M. R. ACHTER ET AL 3,374,662

FLEXURAL FATIGUE MACHINE

Filed April 29, 1966

3 Sheets-Sheet 1

INVENTORS
MEYER R. ACHTER
HUGH H. SMITH
ROBERT J. RILEY
RICHARD L. STEGMAN

BY *Melvin L. Crane* AGENT

ATTORNEY

March 26, 1968 M. R. ACHTER ET AL 3,374,662
FLEXURAL FATIGUE MACHINE
Filed April 29, 1966 3 Sheets-Sheet 2

INVENTORS
MEYER R. ACHTER
HUGH H. SMITH
ROBERT J. RILEY
RICHARD L. STEGMAN
BY *Melvin L. Crane* AGENT
*R. S. Sciascia* ATTORNEY March 26, 1968     M. R. ACHTER ET AL     3,374,662
FLEXURAL FATIGUE MACHINE Filed April 29, 1966     3 Sheets-Sheet 3

INVENTORS
MEYER R. ACHTER
HUGH H. SMITH
ROBERT J. RILEY
RICHARD L. STEGMAN

BY *Melvin L. Crane* AGENT

ATTORNEY

United States Patent Office 3,374,662
Patented Mar. 26, 1968

3,374,662
FLEXURAL FATIGUE MACHINE
Meyer R. Achter, Washington, D.C., Hugh H. Smith, Oxon Hill, Md., and Robert J. Riley, Springfield, and Richard L. Stegman, Annandale, Va., assignors to the United States of America as represented by the Secretary of the Navy
Filed Apr. 29, 1966, Ser. No. 547,073
2 Claims. (Cl. 73—67.4)

The present invention relates to an improved fatigue testing device for the performance of reverse-bending fatigue tests on materials at elevated temperatures and constant amplitude vibration in a controlled environment which may be a vacuum or gas atmosphere and more particularly to an improved fatigue testing device in which the vibration frequency is maintained at resonance by a feedback circuit and the amplitude is maintained constant by another control circuit.

Heretofore prior art reverse-bending fatigue testing devices have been provided in which the metal specimen is mounted for vibratory movement at a constant amplitude within an enlarged vacuum-tight chamber which is externally heated by an enclosing furnace. Such a device is set forth in Patent No. 3,027,757. In the fatigue testing device set forth in the patented invention, the vibratory motion is transmitted to an extension rod and specimen in the gas-tight chamber by means of a pair of electromagnets, 180° out of phase, which are located above and outside the gas-tight chamber and so arranged that a permanent magnet on the upper extremity of the extension rod is alternately repelled by the electromagnets in accordance with a predetermined frequency and amplitude. A signal generator tuned to the resonant frequency of the specimen feeds a signal to a pair of amplifiers, each of which is connected to power a separate one of the electromagnets. A cooled upper portion of the gas-tight chamber contains two sets of electrical contacts arranged to be contacted by a metal sleeve on the extension rod at the end of each oscillation of the specimen. A servo-mechanism receives a signal when each of the sets of probes is contacted by the metal sleeve on the extension rod and operates to hold the amplitude constant. When a crack develops in the specimen with resultant loss in amplitude, the servo-mechanism increases the power in an effort to maintain the amplitude constant until a prelimit switch is closed causing the test to be terminated. In the patented device the electromagnets are manually tuned to the resonant frequency of the specimen assembly. Such an arrangement is adequate for soft materials of high damping capacity; however, it has been determined in working with elastic materials of low damping capacity that it is difficult to tune and to hold the correct frequency manually long enough to generate a visible crack.

The improved system of the present invention makes use of the mechanical features of the heretofore patented device in combination with two transistorized electrical feedback circuits. One feedback circuit keeps the specimen frequency at resonance and the other system comprises two separate loops for controlling the amplitude of operation. The two feedback circuits are controlled by the permanent magnet at the end of the extension rod to which the specimen is secured. As the permanent magnet passes beneath spaced capacitor plates in the vicinity of the electromagnets a sine wave is generated by suitable electronic equipment. This sine wave signal is used to trigger separate transistor switches which permits current to flow from the power supply to the electromagnets. The amount of current is governed by the amplitude-control circuit which senses the vibration amplitude of the specimen by the rod extension striking adjacent electrical contacts at the end of each oscillation of the specimen.

Each of these electrical contacts complete a circuit to each of the separate electrical loops for controlling the amplitude of vibration. Current in these electrical loops is fed through the transistor switches to the electromagnets which in turn repels the magnet on the end of the rod extension to move the extension rod and specimen through their vibratory movement.

It is therefore an object of the present invention to provide an improved flexural fatigue machine including an automatically controlled electronic system for automatically controlling the amplitude of vibration of a specimen.

Another object is to provide a system for automatically maintaining the vibration frequency at resonance while maintaining a constant amplitude of vibration.

Still another object is to provide an improved system for obtaining automatic frequency control of the existing system to the natural period of vibration of the specimen so as to compensate for drift of the natural period of the specimen arising from temperature changes and mechanical alteration of the specimen as a result of applied stress.

While still another object is to provide a fatigue testing system having a magnetic drive for imparting vibratory motion to the specimen through gas-tight seals.

Yet another object is to provide a fatigue testing system which automatically determines the end of test and stops operation of the device.

Figure 2:
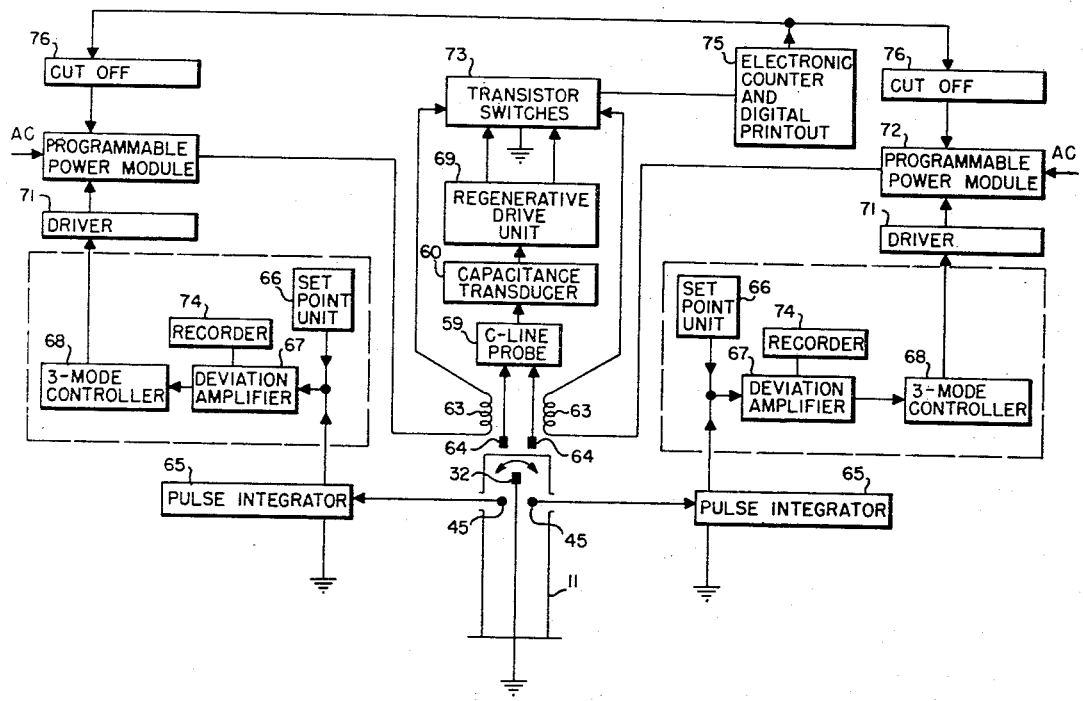
Figure 3:
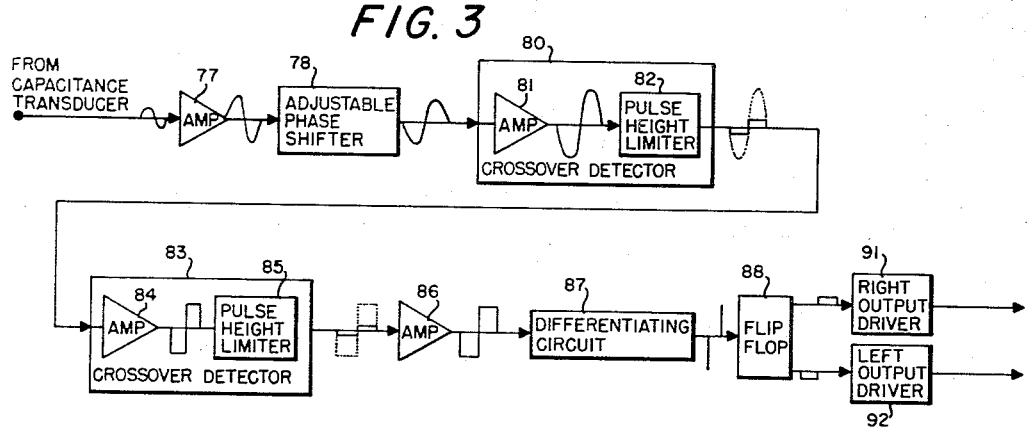
Figure 4:
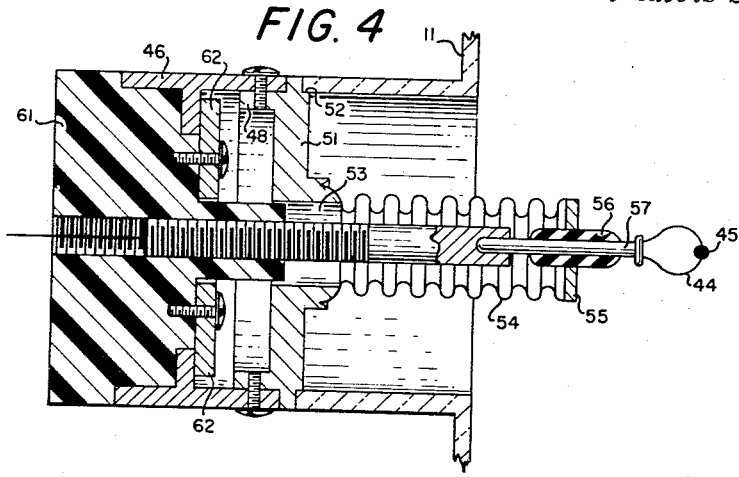
Figure 5:
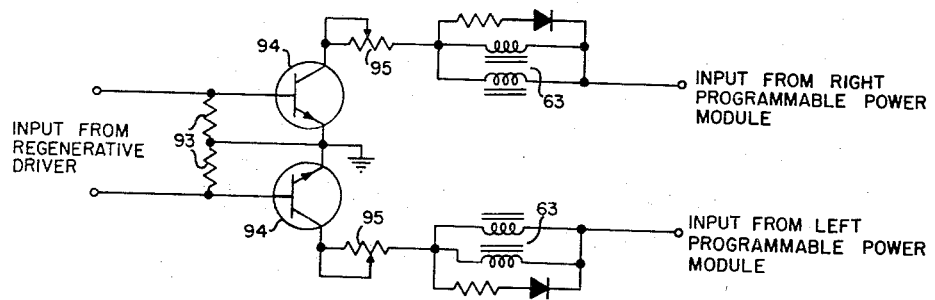

The nature of this invention as well as other objects and advantages thereof will be readily apparent from consideration of the following specification relating to the annexed drawings, in which:

FIG. 1 is a view partly in section of a fatigue testing device made in accordance with the present invention, FIG. 2 is a block diagram of the electrical systems associated with the fatigue test machine of the present invention, FIG. 3 is a functional diagram of a regenerative drive unit associated with the electrical system, FIG. 4 is an enlarged detailed drawing showing an electrical contact associated with the amplitude adjusting mechanism of the system, FIG. 5 represents a schematic diagram including transistor switches that control the current through the electromagnets of the fatigue testing machine.

Figure 6:
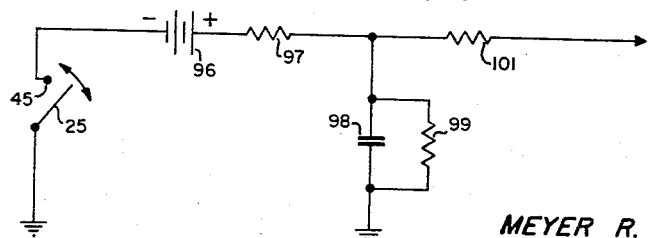

FIG. 6 is a schematic diagram of a pulse integrator associated with the adjustable contact mechanism as illustrated in FIG. 4.

Referring to FIG. 1, a gas-tight elongated chamber 11 contains the specimen to be tested and is made of a heat resistant material. The chamber 11 is mounted on a metal base 12 in a gas-tight relationship by means of a circumferential radial flange 13 which is provided with an inset within which an O-ring 14 of any suitable material is placed. The upper end of the chamber 11 is provided with a gas-tight seal by means of a circumferential radial flange 15 having an inset therein within which an O-ring 14 of any suitable material is placed. A quartz cover 17 encloses the upper end of the chamber in a gas-sealing relationship. A tube 18 extends from the bottom of the chamber into the base area to which a vacuum system is connected for establishing a vacuum in the chamber or for admitting air or any other suitable gas desired into the chamber. The tube 18 is also provided with a valve 21 for opening or closing the vacuum line.

A furnace 23 surrounds the lower part of the chamber and is provided for heating of the elongated gas-tight chamber 11 to create a hot zone in the area containing the specimen. The furnace may be electrically heated and is of a conventional, hinged, sectional construction adapted to be swung opened and closed for admission of the elongated chamber 11. The furnace is independently supported in position in any conventional or suitable way. The upper end of the chamber is provided with an enlarged section 24 to provide suitable space for movement of an extension rod 25 to which the specimen 26 is attached. A radiation shield 27 is secured within the bottom of the enlarged portion to prevent the heat from rising into the upper portion. The radiation shield 27 is provided with a slot 28 across the center thereof to afford movement of the extension rod to which the specimen is connected. Additional cooling coils 31 may be provided to surround the upper and lower portion of the chamber to aid in keeping the upper and lower portion at a relatively cool temperature. The cooling coil about the upper enlarged section protects a magnet 32 on the upper end of the extension rod and the electrical parts against excessive heat.

A tubular member 33 extends upwardly from the base portion axially within the cylindrical chamber and is provided with openings 34 in the side wall thereof for fluid communication with the inside of the chamber. The tubular member extending upwardly into the chamber provides a pedestal to which a specimen grip 35 is formed by an axially disposed cylindrical rod 36 which is provided at the bottom end with a circular flange 37 which seats in the upper portion of the tubular pedestal and welded, brazed or secured thereto by any suitable means. The upper end of the rod is split along the axis to provide a slot therein within which the lower end of a specimen is extended and held thereto by suitable bolts 41 extending radially through the rod which secures the lower end of the specimen to the upper end of the specimen holder. The upper end of the specimen is provided with a pair of holes spaced linearly along the specimen for the purpose of securing the upper end of the specimen between a pair of holding plates 42 which are secured to the lower end of the extension rod 25 as by screw-threads. The extension rod extends upwardly through the chamber coaxial therewith with the upper end extending into the enlarged upper section and the upper end of the extension rod has secured thereto a permanent magnet 32. The permanent magnet is attached to the upper end of the drive rod such that the upper surface of the permanent magnet is in close proximity to the lower surface of the quartz cover which encloses the chamber.

The upper section of the glass sealed chamber has arranged in opposed, aligned openings in the sidewalls thereof a pair of radially adjustable electrical contacts each of which are formed by a fine spring wire 44 (5 mil diameter) threaded through a gold bead contact 45 positioned to be struck by the extension rod, once each half cycle to complete an electrical circuit to separate feedback circuits. Each of the electrical contacts are assembled in a vacuum tight arrangement, the construction and arrangement of parts are as shown in enlarged detail in FIG. 4.

Referring now to FIG. 4, there is shown in enlarged detail an amplitude adjusting mechanism and electrical contact which includes a cylindrical tubular member 46 having an inwardly radially extending flange 47 on the inner surface in which the tubular member is secured to an axially extending cylindrical flange 48 on a partition 51. The flange 48 on the partition 51 is set inwardly thereon a distance equal to the thickness of the cylindrical tubular member 46 which is secured thereto. The opposite side of the partition from the flange is provided with a shoulder 52 to which the wall of the chamber 11 is secured in a vacuum tight seal. The partition 51 is provided with an axial aperture 53 therethrough to which one end of a bellows 54 is secured in a vacuum tight seal. The opposite end of the bellows 54 is secured to the outer edge of a cylindrical plate 55 that has an axial passage therethrough within which a ceramic insulator 56 is secured in a vacuum tight seal. A rod-like electrical conductor 57 passes through the ceramic insulator in a vacuum tight connection and is connected at one end to an electrical conductive threaded screw or bolt 58 and at the other end to the spring wire conductor 44. The spring wire conductor 44 is threaded through a gold bead 45 which is soldered in place on the axis of the conductor 57. The gold bead 45 is used to prevent any change in contact resistance due to corrosion of the spring wire. The threaded conductive bolt 58 is threaded into a nylon knob 61 which is secured for rotational movement to the radially inward extending flange 47 on the tubular member by a metal plate 62 on the opposite side of the radial inward extending flange secured to the inner face of the nylon knob. The nylon knob is used for adjusting the gold bead contact relative to the rod extension which adjustment determines the amplitude of the rod extension.

A pair of spaced electromagnets 63 are mounted to rest upon the quartz cover that encloses the chamber and are so arranged as to be centered with respect to the permanent magnet on the drive rod extension. Each of the electromagnets is connected to a separate feedback circuit which is controlled by the amplitude control contact described above in FIG. 4. The electrical feedback circuit will be explained hereinafter. Also resting on the cover are two spaced capacitor plates 64 which are positioned inside of the electromagnets and are connected to an electronic circuit to operate separate transistor switch circuits which will be described hereinafter.

FIG. 2 illustrates a block diagram of the electrical control circuits in combination with the flexural fatigue machine. As shown, motion of the extension rod and specimen is caused by the repellant force of the electromagnet 63 on either side such that the extension rod makes contact with the electrical contact to complete a circuit to a pulse integrator 65. The voltage output of the pulse integrator is compared with a reference voltage from a set point unit 66 and the difference is amplified in a deviation amplifier 67 from which the amplified voltage is directed to a three-mode controller 68. The three-mode controller provides a continuously variable output signal proportional to the magnitude, duration, and rate and direction of change of the error signal. The voltage signal from the three-mode controller is directed through a driver amplifier 71 that drives a programmable power module 72 which output is connected to one side of one of the electromagnets 63. The other side of the electromagnet is connected through a transistor switch 73 back to ground to complete the circuit thus permitting a current flow through the electromagnet. The above described circuit is duplicated for the opposite swing of the specimen and specimen rod extension to control the electromagnet on the opposite side. As the extension rod is moved through its motion the permanent magnet 32 on the upper end of the rod passes under capacitor plates 64 positioned above the quartz cover of the chamber. The movement of the permanent magnet relative to the capacitor plates produces a capacitance change between the plates and the permanent magnet. This change is detected by the c-line probe, which in conjunction with the capacitance transducer produces a sine wave that is directed to a capacitor transducer 60, the output of which is connected with a regenerative drive unit 69 which amplifies, shifts the phase, differentiates, and produces two separate pulses which trigger the transistor switches 73. The transistor switches then in turn permits the current from the power module 72 to pass through the electromagnets to ground.

A strip chart recorder 74 is connected with each of the deviation amplifier circuits which monitors the error signal from the deviation amplifier to give an indication of whether the amplitude is above or below the desired value. An electronic counter and digital printout 75 records the period of the pulses through the transistor switches. The digital printout also provides an analog output for driving a strip chart recorder. Automatic termination of the specimen test at a predetermined frequency is effected by an "and" gate. A three-position dial switch added to the printout, is set to the first three digits of the desired cutoff period of vibration. When the period of the specimen movement is increased to this value, the power to the power module is cut off by a relay switch 76.

The regenerative drive unit 69 is formed with well known electrical principles into a transistorized circuit to provide two separate pulses one each to each of the transistor switches. FIG. 3 is directed to a diagram which illustrates the principle of the regenerative drive-unit. A sine wave is received from the capacitance transducer 60 which signal is amplified by amplifier 77 and passed through an adjustable phase shifter 78 from which the signal is directed into a cross-over detector 80. The cross-over detector includes an amplifier 81 which further amplifies the signal and directs the signal into a pulse height limiter 82, the signal passes from the pulse height limiter 82 to a second cross-over detector 83. The second cross-over detector also includes an amplifier 84 which amplifies and directs the signal into a pulse height limiter 85 which limits the signal and directs the signal through another amplifier 86 which further amplifies the signal. The signal from the last mentioned amplifier is directed into a differentiating circuit 87. From the differentiating circuit the signal is directed into a flip-flop 88 by which the signal is converted to two separate pulses which in turn trigger separate transistor switches 73. The signal from the flip-flop is directed through a right output driver 91 for one signal and a left output driver 92 for the other signal from which the signals are passed to the right transistor switch from the right output driver and to the left transistor switch through the left output driver. The phase shifter is incorporated to vary the phase angle between the drive pulse and the permanent magnet displacement, to provide a maximum amplitude for a given current.

FIG. 5 is directed to a schematic diagram of the transistor switches 73 which receive their input from the regenerative drive unit and which controls current to the electromagnets 63. As shown, the output of the right output driver 91 of the regenerative circuit is connected to a biasing resistor 93 and to the base of a 2N1490 transistor 94. The emitter of the transistor is connected to ground and the collector is connected with a 500 ohm 12.5 watt potentiometer 95. The other side of the potentiometer is connected with the right electromagnet 63 whereas the opposite side of the right electromagnet is connected with the right power module 72 which is in the feedback circuit to the electromagnet and operative by the specimen extension rod. The left output driver 92 of the regenerative drive unit is likewise connected to a resistor 93 and to the base of a switching transistor 94 to the left electromagnet. The emitter of the switching transistor is connected to ground whereas the collector is connected to one side of a second 500 ohm potentiometer 95. The opposite side of the second potentiometer is connected to the left electromagnet 63 which is connected with the power module 72 for the left electromagnet in the feedback circuit connected with the left electromagnet.

FIG. 6 is a schematic diagram of a pulse integrator 65 which is actuated by the motion of the extension rod 25 which makes contact with the electrical contact 45 adjacent thereto thereby completing the circuit. The extension rod strikes the electrical contact which effectively closes the contact switch momentarily to complete the circuit from the DC power source 96 through a current limiting resistor 97 to a grounded capacitor 98 which has a resistor 99 in parallel therewith. The capacitor is therefore charged by the DC power source during the time the switch is closed by the extension rod. The level of charge on the capacitor depends on the length of time that the extension rod is in contact with the electrical contact thereby closing the switch to the DC power source connected to the capacitor. The output from the capacitor is directed through a resistor 101 which is connected to the output of the set point unit wherein the voltage output of the capacitor is compared to a reference voltage from the set point unit 66. The voltage difference between the output of the capacitor and the output of the set point unit is amplified in the deviation amplifier 67 which directs the output thereof to the three-mode controller 68.

Prior to initial operation of the system, the right and left channel reference voltages generated by the pair of set-point units (FIG. 2) must be balanced and each of the three-mode controller units must be tuned for optimum operation. The reference voltages are easily balanced as follows. With the specimen at rest each of the set-point units are adjusted until both error signals are zero. Then the voltage outputs of each of the set-point units are increased an amount equal to the desired reference voltage. A high sensitivity is obtained by a low reference voltage, but a higher value is conducive to more stable operation. A value of 0.6 mv. gives a good combination of stable operation and precise control of amplitude. To tune each of the three-mode controllers for optimum control with a rapid approach to zero and minimum overshoot the relative effect of the three-modes must be varied to match the response characteristics of the controller to the amplitude variations. Once the reference voltages have been set and the three-mode controllers have been tuned, further adjustments for succeeding tests are unnecessary.

It is also necessary to adjust the phase shifter in the regenerative drive unit for optimum operation. A convenient method of tuning the phase shifter is to raise the manual output adjustments on the three-mode controllers to give a constant amplitude. The phase shifter is then adjusted to give the maximum amplitude of vibration. This amplitude is developed at the resonance frequency under forced vibration. It has been found that the vibration is more stable if the phase shifter in adjusted to produce a frequency slightly lower than resonance. Once the phase angle has been adjusted, it needs no more attention in successive tests until the material under test or the temperature of operation is changed.

In operation of the flexural fatigue machine, it is important that the specimen mount and clamp be rigid and tight. Any looseness, even an imperceptible amount, can result in poor amplitude control. After a pumpdown of the chamber, the furnace is brought to a temperature and held there until an operating vacuum of $1 \times 10^{-6}$ Torr is reached. The amplitude of vibration is raised by means of manually adjusting the electrical contacts to a level slightly below the test amplitude. Both adjustable switch contacts are moved inward until the deviation amplifier recorders are at zero. Automatic control of the amplitude of vibration is begun by switching the three-mode controllers to automatic, and the contacts are then retracted until the desired test amplitude is reached. The extension rod opening and closing the separate switches to the separate pulse integrators, controls the current to the electromagnets thereby maintaining the amplitude of vibration of the specimen constant through the power delivered to the electromagnets through the transistor switches. When a crack develops in the specimen, the resonant frequency is decreased, thus requiring more power for the electromagnets. This power increase is controlled by the feedback circuit which in turn controls the frequency of the travel of the extension rod and thereby flexure of its specimen. When the period of the specimen movement amplitude is increased to a predetermined value, the power is automatically cut off and the test ended.

Hard and soft materials do not respond similarly to the electromagnetic drive. For example, with a hard material such as Inconel X care must be taken that no overshoot is encountered in coming up to the test amplitude. With a softer material, such as Type 316 stainless steel, there is no such problem. With softer materials there is the possibility of some creep at temperatures of the order of 800° C., therefore a two-channel control of the amplitude of vibration is necessary. Inconel X, however, does not have this tendency in that temperature range and testing can be accomplished with only one channel control. Elimination of one of the channels considerably simplifies the equipment and testing procedure.

Although the characteristics of the two materials are somewhat different, the accuracy of amplitude control is about the same for both. Any short-term cycling or long-time variation due to drift in the electronic instrumentation or deformation of the contacts can be measured directly by readings of a traveling microscope, not shown for simplification of the drawings. Any such variations are, for an amplitude of 1.0 cm., within the reproducibility of readings with the microscope, which is 0.0025 cm. Therefore, the variation of amplitude is less than 0.25 percent. Since the frequency of vibration is a function of amplitude, decreasing as the amplitude increases, the constancy of the frequency of vibration may be used as an indication of the amplitude control. According to the electronic counter the period of vibration is constant to 0.04 percent.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. In combination in a reverse-bending fatigue testing device,
    an elongated gas-tight chamber having a magnetically transparent upper end cover,
    specimen holding means within said chamber for holding one end of a test specimen,
    an extension rod for attaching to the opposite end of said test specimen, and extending upwardly in close proximity to said cover,
    a permanent magnet attached to the upper end of said extension rod juxtaposed the chamber cover,
    spaced electromagnets secured above said chamber cover equi-distant from the axis of said chamber,
    spaced capacitor plate elements secured above said chamber cover within the spacing of said electromagnets and equi-distant from the axis of said chamber,
    a pair of radially adjustable electrical contact members extending into the upper end of said chamber normal to the axis thereof and secured in opposed radial relationship to each other,
    a separate electrical feedback circuit connected to each of said electrical contact members and connected separately to each of said electromagnets,
    an electrical circuit connected with said capacitor plates and to a pair of electrical switches,
    said pair of electrical switches completing the circuit for each of said separate feedback circuits to pass current separately through each of said electromagnets to energize the electromagnets,
    whereby said permanent magnet on the end of said extension rod is repelled by each of said electromagnets to move the extension rod through its amplitude thereby flexing a specimen secured to said specimen holder and to the end of the extension rod while generating a switch signal to control said switches.

2. In combination in a reverse-bending fatigue testing device as claimed in claim 1, wherein:
    the motion of the extension rod and the magnet thereon relative to said spaced capacitor plates during flexure of said specimen causes a sine wave to be produced which in turn operates said switches for controlling said feedback circuit to said electromagnets.

References Cited
UNITED STATES PATENTS

| | | | |
|---|---|---|---|
| 2,625,659 | 1/1953 | Mendelson | 73—67.4 |
| 2,788,659 | 4/1957 | Radnar et al. | 73—67.4 |
| 3,005,334 | 10/1961 | Taylor et al. | 73—67.3 |
| 3,027,757 | 4/1962 | Achter et al. | 73—67.4 |

RICHARD C. QUEISSER, *Primary Examiner.*

JAMES H. WILLIAMSON, *Assistant Examiner.*